United States Patent
Termath

(10) Patent No.: US 11,628,589 B2
(45) Date of Patent: Apr. 18, 2023

(54) MIXTURES OF AMMONIUM POLYPHOSPHATE AND AT LEAST ONE SOLUBLE IONIC COMPOUND CONTAINING SULFATE AND/OR IS CAPABLE OF RELEASING SULFATE IONS

(71) Applicant: CLARIANT PLASTICS & COATINGS LTD, Muttenz (CH)

(72) Inventor: Andreas Termath, Cologne (DE)

(73) Assignee: Clariant International Ltd, Muttenz (CH)

( * ) Notice: Subject to any disclaimer, the term of this patent is extended or adjusted under 35 U.S.C. 154(b) by 0 days.

(21) Appl. No.: 15/769,219

(22) PCT Filed: Oct. 18, 2016

(86) PCT No.: PCT/EP2016/074936
§ 371 (c)(1),
(2) Date: Apr. 18, 2018

(87) PCT Pub. No.: WO2017/067906
PCT Pub. Date: Apr. 27, 2017

(65) Prior Publication Data
US 2018/0304493 A1    Oct. 25, 2018

(30) Foreign Application Priority Data

Oct. 20, 2015  (DE) .......................... 102015220392.1
Oct. 17, 2016  (DE) .......................... 102016220264.2

(51) Int. Cl.
| | | |
|---|---|---|
| B27K 3/20 | (2006.01) | |
| B27K 3/16 | (2006.01) | |
| B27K 3/32 | (2006.01) | |
| C09D 5/18 | (2006.01) | |
| C09D 7/63 | (2018.01) | |
| C09D 7/65 | (2018.01) | |
| C09K 21/04 | (2006.01) | |
| C09K 21/10 | (2006.01) | |
| H01B 7/295 | (2006.01) | |
| C01B 25/40 | (2006.01) | |
| C08K 5/00 | (2006.01) | |
| C08K 5/41 | (2006.01) | |

(52) U.S. Cl.
CPC .............. B27K 3/20 (2013.01); B27K 3/166 (2013.01); B27K 3/32 (2013.01); C01B 25/405 (2013.01); C09D 5/185 (2013.01); C09D 7/63 (2018.01); C09D 7/65 (2018.01); C09K 21/04 (2013.01); C09K 21/10 (2013.01); H01B 7/295 (2013.01); B27K 2240/30 (2013.01); C08K 5/0066 (2013.01); C08K 5/41 (2013.01)

(58) Field of Classification Search
None
See application file for complete search history.

(56) References Cited

U.S. PATENT DOCUMENTS

| | | | |
|---|---|---|---|
| 3,653,821 A | 4/1972 | Heymer et al. | |
| 3,941,896 A | 3/1976 | Smith et al. | |
| 3,978,195 A | 8/1976 | Schrodter et al. | |
| 4,272,414 A * | 6/1981 | Vandersall | C09K 21/04 106/14.12 |
| 5,277,887 A | 1/1994 | Staffel et al. | |
| 7,144,527 B2 | 12/2006 | Thewes et al. | |
| 2008/0099735 A1 | 5/2008 | Garner | |
| 2010/0200819 A1* | 8/2010 | Mans Fibla | A62D 1/005 252/602 |
| 2016/0030789 A1* | 2/2016 | Cordani | A62D 1/0014 252/2 |

FOREIGN PATENT DOCUMENTS

| | | | |
|---|---|---|---|
| CN | 102911566 B | 4/2015 | |
| CN | 104860630 A | 8/2015 | |
| CN | 104927499 A | 9/2015 | |
| EP | 0004560 A1 | 10/1979 | |
| EP | 0537475 A1 | 4/1993 | |
| EP | 0718388 A2 * | 6/1996 | ............. C09D 5/185 |
| EP | 1400573 A1 | 3/2004 | |
| JP | 10-204212 A | 8/1998 | |
| JP | 10204212 * | 8/1998 | |
| JP | 2001206978 A | 7/2001 | |
| KR | 20120052616 A * | 5/2012 | |
| WO | 97/22753 A1 | 6/1997 | |
| WO | 2008/031559 A2 | 3/2008 | |
| WO | 2008031559 A2 | 3/2008 | |
| WO | WO-2008031559 A2 * | 3/2008 | ............... A62D 1/00 |

OTHER PUBLICATIONS

Exolit 422 Product Data Sheet (Year: 2013).*
Reactive Polymers Fundamentals and Applications, 2 Poly(urethane)s, p. 70, 2.3.3.3. (Year: 2013).*
Kim et al. A review of application of ammonium polyphosphate as intumescent flame retardant in thermoplastic composites. Composites Part B, 84, 155-174 (Year: 2016).*
Stark et al., Evaluation of various fire retardants for use in wood flour—polyethylene composites, Polymer Degradation and Stability 95: 1903-1910 (2010).
Nikolaeva et al., A Review of Fire Retardant Processes and Chemistry, with Discussion of the Case of Wood-plastic Composites, Baltic Forestry 17: 314-326 (2011).
International Search Reported dated Jan. 18, 2017, issued in International Application No. PCT/EP2016/074936.
Written Opinion dated Jan. 18, 2017, issued in International Application No. PCT/EP2016/074936.

(Continued)

Primary Examiner — Tanisha Diggs
(74) Attorney, Agent, or Firm — Morgan, Lewis & Bockius LLP

(57) ABSTRACT

The invention relates to mixtures containing, as component (A) ammonium polyphosphate and, as component (B) a soluble ionic compound which contains sulfate and/or is capable of releasing sulfate ions. The invention also relates to a method for producing such mixtures and to the use thereof.

15 Claims, No Drawings

(56) References Cited

OTHER PUBLICATIONS

C. Y. Shen et al.—Journal of American Chemical Society, Bd. vol. 91, S. 62 (1969).
M. Watanabe, M. Sakurai, M. Takahashi, Phosphorus Research Bulletin 2003, vol. 16, pp. 39-46.
M. Watanabe, N. Narita, M. Sakurai, H. Suzuki, Bulletin of the Chemical Society of Japan 2000, vol. 73, pp. 115-119.
R. C. Sheridan, J. F. Mccullough, N. E. Stahlheber, C. Y. Shen Inorganic Syntheses, John Wiley & Sons, Inc, vol. 19, 2007, 278ff.
K. R. Waerstad, G. H. McClellan, J. Agric. Food Chem. 1976, vol. 24, pp. 412-415.
M. Watanabe, H. Suzuki, S. Kawasaki, M. Maeda, M. Sakurai, in Phosphorus Research Bulletin 2002, vol. 14, pp. 105-110.
G. Liu, X. Liu, J. Yu, Ind. Eng. Chem. Res. 2010, vol. 49, pp. 5523-5529.
Y. L. Liu, G. S. Liu, AMR 2011, vols. 233-235, pp. 109-112.
M. Watanabe, M. Sakurai, M. Maeda, Phosphorus Research Bulletin 2009, vol. 23, pp. 35-44.
G. Liu, W. Chen, J. Yu, Ind. Eng. Chem. Res. 2010, vol. 49, pp. 12148-12155.
Edward D. Weil, Fire-Protective and Flame-Retardant Coatings—A State-of-the-Art Review, Journal of Fire Sciences, vol. 29—May 2011 (pp. 259-296).
Office Action issued in Japanese Patent Application 2018-519855 dated Jul. 15, 2020.
Office Acton issued in Indian Patent Application No. 201817016025 dated Feb. 26, 2020.
Search Report issued in WO 2017/067906 A1 dated Apr. 27, 2017.
First Office Action dated Jun. 3, 2021 in corresponding Chinese Application No. 201680041797.7 (19 pages, including English Translation).
Guozhi et al., "Anticorrosion Coating Technology and Equipment Application Manual", Beijing: China Petrochemical Publishing House, pp. 386-387, Jun. 2004.
Office Action dated Sep. 5, 2022, issued in corresponding Chinese Patent Application No. 201680041797.7.
Yu et al., Handbook of Flame Retardant Materials, Beijing: Public Publishing House, p. 67 of text portion, Mar. 1997 [retrieved from the internet].
Manufacturing Technology of Fine Inorganic Chemicals, text portion of pp. 288-290, Aug. 2008 [retrieved from the internet].
Office Action dated Dec. 23, 2022, issued in corresponding Chinese Patent Application No. 201680041797.7.

\* cited by examiner

MIXTURES OF AMMONIUM POLYPHOSPHATE AND AT LEAST ONE SOLUBLE IONIC COMPOUND CONTAINING SULFATE AND/OR IS CAPABLE OF RELEASING SULFATE IONS

The invention relates to mixtures of ammonium polyphosphate and at least one soluble ionic compound.

Ammonium polyphosphates are widely used as flame retardants. In addition, ammonium polyphosphate can be used to prevent the development of nitrous gases in (acid) baths that contain free nitric acid and serve for surface treatment of metals (EP-A-0004560).

Ammonium polyphosphates can occur in multiple crystalline forms (I to VI), of which ammonium polyphosphate of the I form can be synthesized from a condensing agent and phosphoric acid or a phosphate.

Ammonium polyphosphate of the II form is a sparingly water-soluble product and is known, for instance, as a flame-retardant constituent for use in synthetic resins. It is typically produced from phosphorus pentoxide.

It is a characteristic feature of known processes for preparing ammonium polyphosphate of the II form that ammonium polyphosphate of the I form is subjected to a heat treatment for a certain period of time, as described, for instance, in Journal of American Chemical Society, vol. 91, p. 62 (1969), author: C. Y. Shen et al. Likewise described here are processes for producing crystal forms II and IV.

M. Watanabe, M. Sakurai, M. TAKAHASHI, Phosphorus Research Bulletin 2003, 16, 39-46 describe ammonium polyphosphates of the I form and the V form.

Different processes for preparing ammonium polyphosphates of the II form are described by M. Watanabe, N. Narita, M. Sakurai, H. Suzuki, Bulletin of the Chemical Society of Japan 2000, 73, 115-119 and R. C. Sheridan, J. F. McCullough, N. E. Stahlheber, C. Y. Shen in Inorganic Syntheses, John Wiley & Sons, Inc., 2007, and K. R. Waerstad, G. H. McClellan, J. Agric. Food Chem. 1976, 24, 412-415.

A method of preparing ammonium polyphosphates of the V form is described by M. Watanabe, H. Suzuki, S. KAWASAKI, M. MAEDA, M. Sakurai, in Phosphorus Research Bulletin 2002, 14, 105-110.

Processes for preparing ammonium polyphosphate of the VI form and the description of this product can be found in G. Liu, X. Liu, J. Yu, Ind. Eng. Chem. Res. 2010, 49, 5523-5529 and Y. L. Liu, G. S. Liu, A M R 2011, 233-235, 109-112 and in M. Watanabe, M. Sakurai, M. MAEDA, Phosphorus Research Bulletin 2009, 23, 35-44 and also in G. Liu, W. Chen, J. Yu, Ind. Eng. Chem. Res. 2010, 49, 12148-12155.

U.S. Pat. No. 3,978,195 claims a process for preparing essentially water-insoluble, catenated ammonium polyphosphates, wherein equimolar amounts of ammonium orthophosphate and phosphorus pentoxide are reacted in the presence of ammonia gas at temperatures between 170 and 350° C. in a reactor provided with mixing tools, with constant mixing, kneading and comminuting.

In the process described in EP-A-0537475, in a first phase, ammonium orthophosphate, phosphorus pentoxide and gaseous ammonia are reacted with one another, in order to further condense and to dry the intermediate in a second stage in a pan drier under an ammonia atmosphere.

The ammonium polyphosphates known to date are very often used in intumescent formulations which are then utilized in turn as fire protection coatings. However, the ammonium polyphosphate frequently leads, in this application, to inadequate storage stability of the intumescent formulations. Frequently, the viscosity of such intumescent formulations is also too high, such that they are difficult to handle.

Attempts have therefore often been made to improve these drawbacks by addition of further substances, but there is no technically effective solution to date.

It is therefore an object of the present invention to find a composition which, in intumescent formulations, achieves adequate storage stability and reduces the viscosity of the same intumescent formulation.

This object is achieved by mixtures comprising
as component (A) ammonium polyphosphate and
as component (B) at least one soluble ionic compound that contains sulfate and/or is capable of releasing sulfate ions.

Preferably, component (A) is an ammonium polyphosphate of the crystal form I, II, III, IV, V, VI, a branched ammonium polyphosphate and/or mixtures thereof.

More preferably, the ammonium polyphosphate (component (A)) is one of the crystal form I, II, V and/or mixtures thereof.

Preferably, the ammonium polyphosphate (component (A)) is one of the formula $(NH_4)_{n+2}P_nO_{3n+1}$ with $n \geq 2$.

More preferably, the ammonium polyphosphate (component (A)) is one of the formula $(NH_4)_{n+2}P_nO_{3n+1}$ with n from 10 to 10 000.

Preferably, component (B) comprises sulfates, hydrogensulfates, peroxomonosulfates, peroxodisulfates, sulfur trioxide, sulfuric acid, sulfur dioxide and/or mixtures thereof.

Preferably, component (B) comprises potassium cations, sodium cations, calcium cations, magnesium cations, iron cations, silver cations, copper cations, titanium cations, zinc cations and/or tin cations, nitrogen-containing cations, sulfonium cations, carbocations and/or phosphonium cations.

Preferably, the nitrogen-containing cations are ammonium, melamine, mono-, di-, trialkylammonium, mono-, di-, triarylammonium, or they derive from salts of protonated nitrogen bases such as urea, biuret, guanidine, alkylguanidine, arylguanidine, diphenylguanidine, biguanide, biuret, allantoin, acetoguanamine, benzoguanamine, tolyltriazole, benzotriazole, 2-amino-4-methylpyrimidine, benzylurea, ethylenedimelamine, acetyleneurea, hydantoin, malonamide amidine, dimethylurea, 5,5-diphenylhydantoin, N,N'-diphenylurea, ethylenebis-5-triazone, glycine anhydride, tetramethylurea, triethanolamine, triethylamine, trimethylamine, diisopropylamine, pyridine, pyrrole, 4-(dimethylamino) pyridine, piperidine, imidazole, pyrimidine, triazine, triethylenediamine, amino acids, morpholine, condensation products of melamine such as melem, melam or melon or more highly condensed compounds of this type and/or mixtures thereof.

Preferably, component (B) is ammonium sulfate, triethylammonium sulfate, tetramethylammonium sulfate, trimethylammonium sulfate, dimethyl sulfate, diethyl sulfate, dipropyl sulfate, sodium octylsulfate, sodium decylsulfate, sodium octadecylsulfate, lauryl sulfate, urea sulfate, melamine sulfate, hydroxalamine sulfate, hydrazine sulfate, potassium sulfate, potassium hydrogensulfate, sodium sulfate, sodium hydrogensulfate, magnesium sulfate, magnesium hydrogensulfate, calcium sulfate, calcium hydrogensulfate, barium sulfate, potassium aluminum sulfate, aluminum sulfate, iron (III) sulfate, iron (II) sulfate, cobalt sulfate, titanium sulfate, zinc sulfate, tin sulfate, cerium sulfate, lithium sulfate, trimethylsulfonium methylsulfate or mixtures thereof.

More preferably, component (B) is ammonium sulfate.

Preferably, the mixtures of the invention contain
99.55% to 99.99% by weight of component (A) and
0.01% to 0.45% by weight of component (B), where the sum total of the components is 100% by weight.

More preferably, the mixtures of the invention contain
99.60% to 99.80% by weight of component (A) and
0.20% to 0.40% by weight of component (B), where the sum total of the components is 100% by weight.

In particular, the mixtures of the invention contain
99.60% to 99.80% by weight of ammonium polyphosphate and
0.20% to 0.40% by weight of ammonium sulfate, where the sum total of the components is 100% by weight.

Preference is given to mixtures as claimed in one or more of claims 1 to 13, which contain
99.55% to 99.99% by weight of component (A) and
0.01% to 0.45% by weight of lithium sulfate, sodium sulfate, magnesium sulfate, calcium sulfate, barium sulfate, iron sulfate, zinc sulfate, titanium sulfate, titanium oxysulfate, aluminum sulfate, cerium sulfate, melamine sulfate, urea sulfate and/or ammonium sulfate, where the sum total of the components is 100% by weight.

Preferably, the mixtures of the invention contain
99.60% to 99.98% by weight of component (A) and
0.02% to 0.40% by weight of lithium ions, sodium ions, magnesium ions, calcium ions, barium ions, iron ions, zinc ions, titanium ions, aluminum ions and/or cerium ions, where the sum total of the components is 100% by weight.

Preferably, it is a characteristic feature of the mixtures of the invention that they have a
residual moisture content of less than 0.5%,
bulk density of 0.3 to 0.9 g/cm$^3$,
water solubility of less than 0.5% (10% suspension in water at 25° C.),
viscosity of less than 40 mPas (Brookfield DV3T, spindle 1),
a particle size $d_{50}$ of 5 to 35 μm,
a chain length of n greater than 1000 and
a pH of 4 to 8.

The invention also relates to a process for producing mixtures as claimed in one or more of claims 1 to 14, which comprises mixing components (A) and component B) together, each in pulverulent or granular form, or introducing the dissolved ionic compound (component (B)) into component (A).

Preference is given here to mixing
99.55% to 99.99% by weight of ammonium polyphosphate and
0.01% to 0.45% by weight of ammonium sulfate with one another.

A further process for producing mixtures as claimed in one or more of claims 1 to 14 comprises heating equimolar amounts of ammonium dihydrogenorthophosphate and urea to a temperature of 250 to 300° C. for a period of 0.5 to 4 hours with simultaneous addition of component (B).

Another process for producing mixtures as claimed in one or more of claims 1 to 14 comprises heating equimolar amounts of ammonium orthophosphate and urea to a temperature of 250 to 305° C. for a period of 0.1 to 4 hours under a moist ammonia atmosphere with simultaneous addition of component (B).

An alternative process for producing mixtures as claimed in one or more of claims 1 to 14 comprises heating equimolar amounts of ammonium orthophosphate and urea to a temperature of 320 to 350° C. for a period of 0.1 to 4 hours under a moist ammonia atmosphere with simultaneous addition of component (B).

A multistage process for producing mixtures as claimed in one or more of claims 1 to 14 comprises mixing and reacting phosphorus pentoxide, diammonium orthophosphate and ammonium sulfate together in molarity ratios of 1:1:0.01 to 0.08 in ammonia gas atmosphere over a period of 5 to 10 minutes and then successively a) conducting a polymerization reaction over a period of 15 to 45 minutes with supply of ammonia gas at a maximum reactor pressure of 490 to 980 Pa and at a minimum temperature of 180 to 200° C., b) feeding in ammonia gas at a temperature in the range from 200 to 220° C. and a minimum reactor pressure between 0 and 980 Pa for a period of 2 to 4 hours, c) separating off and working up the products obtained.

The invention also relates to the use of mixtures as claimed in one or more of claims 1 to 14 for reducing the viscosity of intumescent compositions, for increasing the storage stability of aqueous intumescent compositions, as flame retardants for clearcoats and intumescent coatings, in or as flame retardants for wood and other cellulosic products, in or as reactive and/or nonreactive flame retardants for polymers, gelcoats, unsaturated polyester resins, for production of flame-retardant polymer molding compounds, for production of flame-retardant polymer moldings, for rendering polyester and pure and mixed cellulose fabrics flame-retardant by impregnation, in polyurethane foams, in polyolefins, in unsaturated polyesters and phenol resins, for rendering textiles flame-retardant.

The inventive mixtures as claimed in one or more of claims 1 to 14 can be used in or for plug connectors, current-bearing components in power distributors (residual current protection), printed circuit boards, potting compounds, power connectors, circuit breakers, lamp housings, LED lamp housings, capacitor housings, coil elements, ventilators, grounding contacts, plugs, in/on printed circuit boards, housings for plugs, cables, flexible circuit boards, charging cables, motor covers, textile coatings and other products.

The invention finally also comprises an intumescent formulation for a fire protection coating, comprising film-forming binders, blowing agents, substances that form foam layers and carbon in the event of fire, and auxiliaries and additives, which comprises mixtures as claimed in one or more of claims 1 to 14.

As explained at the outset, ammonium polyphosphate is a widely used product and is used very frequently in fire protection.

The ammonium polyphosphates are generally long-chain products, but they may also be branched, as shown below.

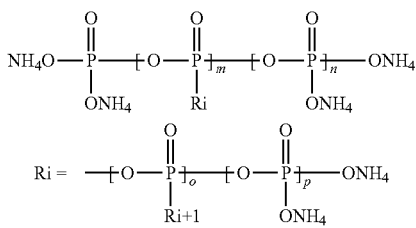

In these formulae,
m is 0 to 50,
n is 9 to 9999, o is 0 to 5,
p is 1 to 1000 and
i is 1 to 49 and
$R_{50}$ is $NH_4$.

The individual monomer units may be bonded to one another in random sequence.

The formation of cyclic structural units is also possible.

The most commonly prepared ammonium polyphosphates are those of the II form, but the I and V forms are also used.

A preferred field of use for ammonium polyphosphates is in intumescent formulations, which are then employed at a later stage as a fire protection coating.

It is a feature of intumescent coatings, also called insulating layer-forming fire protection coatings, that they foam in the event of fire under the action of corresponding temperatures, and this foaming of the fire protection coating prevents or at least hinders the passage of heat to steel constructions, ceilings, walls, cables, pipes and the like. The foam layer of the fire protection coating that has then foamed has a thickness here of several centimeters and prevents any direct effect of the fire on the materials and constructions beneath the foam layer for a certain period of time.

Preferred insulating layer-forming fire protection coatings are produced on the basis of substances that form foam and carbon in the event of fire, film-forming binders, blowing agents and customary auxiliaries and additives.

Film-forming binders used may, for example, be homopolymers based on vinyl acetate, copolymers based on vinyl acetate, ethylene and vinyl chloride; based on vinyl acetate and the vinyl ester of a carboxylic acid; based on vinyl acetate and di-n-butyl maleate or acrylic esters; based on styrene and acrylic esters and/or copolymers based on acrylic esters, vinyltoluene/acrylate copolymer, styrene/acrylate copolymer, vinyl/acrylate copolymer, self-crosslinking polyurethane dispersions.

Particularly suitable foam-forming substances are ammonium salts of phosphoric acids and/or polyphosphoric acids. These may be encapsulated or unencapsulated.

Carbohydrates, preferably pentaerythritol, dipentaerythritol, tripentaerythritol and/or polycondensates of pentaerythritol, are used as carbon-forming substances.

Suitable blowing agents are melamines and/or guanidine and salts thereof and/or dicyandiamides, preferably melamine phosphate, melamine cyanurate, melamine borate, melamine silicate and/or guanidine phosphate.

In addition, the insulating layer-forming fire protection coating may comprise melamine polyphosphate, dialkylphosphinic salts and other phosphorus compounds, and also, as auxiliaries and additives, glass fibers, mineral fibers, kaolin, talc, aluminum oxide, aluminum hydroxide, magnesium hydroxide, precipitated silicas, silicates and/or pulverized celluloses and others.

Fire protection coatings (intumescent coatings) of this kind are used predominantly in the form of a paintable, spreadable or rollable paint for protection of a wide variety of different substrates, preferably of steel, wood, electrical cables and pipes.

The mixtures of the invention are of excellent suitability for the aforementioned use in intumescent formulations and then later as a fire protection coating.

The mixtures of the invention can preferably also be used in polyolefins.

Preferred polyolefins are, for example, polymers of mono- and diolefins (e.g. ethylene, propylene, isobutylene, butene, 4-methylpentene, isoprene, butadiene, styrene), for example polypropylene, polyisobutylene, polybut-1-ene, poly-4-methylpent-1-ene, polystyrene, poly(p-methylstyrene) and/or poly(alpha-methylstyrene), polyisoprene or polybutadiene, and polyethylene (optionally crosslinked), for example high-density polyethylene (HDPE), high-density polyethylene of high molecular weight (HDPE-HMW), high-density polyethylene of ultrahigh molecular weight (HDPE-UHMW), medium-density polyethylene (MDPE), low-density polyethylene (LDPE), linear low-density polyethylene (LLDPE), very low-density polyethylene (VLDPE), branched low-density polyethylene (BLDPE), and also polymers of cycloolefins, for example of cyclopentene or norbornene.

The aforementioned polyolefins, especially polyethylenes and polypropylenes, are preferably prepared according to the prior art by free-radical polymerization (normally at high pressure and high temperatures) or catalytic polymerization by means of transition metal catalysts.

Preferred polymers are additionally mixtures (blends) of the above-listed polyolefins, for example polypropylene with polyisobutylene, polyethylene with polyisobutylene, polypropylene with polyethylene (e.g. PP/HDPE/LDPE) and mixtures of various polyethylene types (e.g. LDPE/HDPE).

Polymers usable with preference are additionally copolymers of mono- and diolefins with one another and of mono- and diolefins with other vinylic monomers, for example ethylene-propylene copolymers; LLDPE, VLDPE and mixtures thereof with LDPE; propylene-but-1-ene copolymers, propylene-isobutylene copolymers, ethylene-but-1-ene copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers, copolymers of styrene or alpha-methylstyrene with diamines or acrylic derivatives, for example styrene-butadiene, styrene-acrylonitrile, styrene-alkyl methacrylate, styrene-butadiene-alkyl acrylate and methacrylate, styrene-maleic anhydride, styrene-acrylonitrile-methyl acrylate; mixtures of high toughness of styrene copolymers and another polymer, for example a polyacrylate, a diene polymer or an ethylene-propylene-diene terpolymer; and block copolymers of styrene, for example styrene-butadiene-styrene, styrene-isoprene-styrene, styrene-ethylene/butylene-styrene or styrene-ethylene/propylene-styrene, and also graft copolymers of styrene or alpha-methylstyrene, for example styrene onto polybutadiene, styrene onto polybutadiene-styrene or polybutadiene acrylonitrile copolymers, styrene and acrylonitrile (or methacrylonitrile) onto polybutadiene; styrene, acrylonitrile and methyl methacrylate onto polybutadiene; styrene and maleic anhydride onto polybutadiene; styrene, acrylonitrile and maleic anhydride or maleimide onto polybutadiene; styrene and maleimide onto polybutadiene, styrene and alkyl acrylates or alkyl methacrylates onto polybutadiene, styrene and acrylonitrile onto ethylene-propylene-diene terpolymers, styrene and acrylonitrile onto polyalkyl-acrylates or polyalkylmethacrylates, styrene and acrylonitrile onto acrylate-butadiene copolymers, and mixtures thereof, as known, for example, as ABS, MBS, ASA or AES polymers; and also copolymers thereof with carbon monoxide or ethylene-acrylic acid copolymers and salts thereof (ionomers) and also terpolymers of ethylene with propylene and a diene, for example hexadiene, dicyclopentadiene or ethylidenenorbornene; and mixtures of such copolymers with one another and/or other polymers, e.g. polypropylene-ethylene-propylene copolymer, LDPE-ethylene-vinyl acetate copolymer, LDPE-ethylene-acrylic acid copolymer, LLDPE-ethylene-vinyl acetate copolymer, LLDPE-ethylene-acrylic acid copolymer, and alternating or random polyalkylene-carbon monoxide copolymers and mixtures thereof with other polymers, for example polyamides.

The mixtures of the invention as claimed in one or more of claims 1 to 14 can also in thermoplastic polymers such as polyester, polystyrene or polyamide and thermoset polymers such as unsaturated polyester resins, epoxy resins, polyurethanes or acrylates.

Suitable polyesters derive from dicarboxylic acids and the esters and diols thereof and/or from hydroxycarboxylic acids or the corresponding lactones. Particular preference is given to using terephthalic acid and ethylene glycol, propane-1,3-diol and butane-1,3-diol.

Suitable polyesters include polyethylene terephthalate, polybutylene terephthalate (Celanex® 2500, Celanex® 2002, from Celanese; Ultradur®, from BASF), poly-1,4-dimethylolcyclohexane terephthalate, polyhydroxy-benzoates, and also block polyether esters which derive from polyethers having hydroxyl end groups; and also polyesters modified with polycarbonates or MBS.

Preferably, the polymers are polymers of mono- and diolefins, for example polypropylene, polyisobutylene, polybutene-1, poly-4-methylpentene-1, polyisoprene or polybutadiene, and polymers of cycloolefins, for example of cyclopentene or norbornene; and also polyethylene (which may optionally be crosslinked), e.g. high-density polyethylene (HDPE), high-density polyethylene of high molar mass (HDPE-HMW), high-density polyethylene of ultra-high molar mass (HDPE-UHMW), medium-density polyethylene (MDPE), low-density polyethylene (LDPE), linear low-density polyethylene (LLDPE), branched low-density polyethylene (BLDPE), and mixtures thereof.

Preferably, the polymers are copolymers of mono- and diolefins with one another or with other vinyl monomers, for example ethylene-propylene copolymers, linear low-density polyethylene (LLDPE) and mixtures thereof with low-density polyethylene (LDPE), propylene-butene-1 copolymers, propylene-isobutylene copolymers, ethylene-butene-1 copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and copolymers thereof with carbon monoxide, or ethylene-acrylic acid copolymers and salts thereof (ionomers), and also terpolymers of ethylene with propylene and a diene, such as hexadiene, dicyclopentadiene or ethylidenenorbornene; and also mixtures of such copolymers with one another, e.g. polypropylene/ethylene-propylene copolymers, LDPE/ethylene-vinyl acetate copolymers, LDPE/ethylene-acrylic acid copolymers, LLDPE/ethylene-vinyl acetate copolymers, LLDPE/ethylene-acrylic acid copolymers and alternating or random polyalkylene/carbon monoxide copolymers and mixtures thereof with other polymers, for example polyamides.

Preferably, the polymers are hydrocarbon resins (e.g. $C_5$-$C_9$) including hydrogenated modifications thereof (e.g. tackifier resins) and mixtures of polyalkylenes and starch.

Preferably, the polymers are polystyrene (Polystyrene 143E (BASF)), poly(p-methylstyrene), poly(alpha-methylstyrene).

Preferably, the polymers are copolymers of styrene or alpha-methylstyrene with dienes or acrylic derivatives, for example styrene-butadiene, styrene acrylonitrile, styrene-alkyl methacrylate, styrene-butadiene-alkyl acrylate and methacrylate, styrene-maleic anhydride, styrene-acrylonitrile-methyl acrylate; mixtures of high toughness of styrene copolymers and another polymer, for example a polyacrylate, a diene polymer or an ethylene-propylene-diene terpolymer; and block copolymers of styrene, for example styrene-butadiene-styrene, styrene-isoprene-styrene, styrene-ethylene/butylene-styrene or styrene-ethylene/propylene-styrene.

Preferably, the polymers are graft copolymers of styrene or alpha-methyl styrene, for example styrene onto polybutadiene, styrene onto polybutadiene-styrene or polybutadiene-acrylonitrile copolymers, styrene and acrylonitrile (or methacrylonitrile) onto polybutadiene; styrene, acrylonitrile and methyl methacrylate onto polybutadiene; styrene and maleic anhydride onto polybutadiene; styrene, acrylonitrile and maleic anhydride or maleimide onto polybutadiene; styrene and maleimide onto polybutadiene, styrene and alkyl acrylates or alkyl methacrylates onto polybutadiene, styrene and acrylonitrile onto ethylene-propylene-diene terpolymers, styrene and acrylonitrile onto polyalkylacrylates or polyalkyl-methacrylates, styrene and acrylonitrile onto acrylate-butadiene copolymers, and mixtures thereof, as known, for example, as ABS, MBS, ASA or AES polymers.

Preferably, the styrene polymers are foam with comparatively coarse pores, such as EPS (expanded polystyrene), e.g. Styropor® (BASF), and/or with finer pores, such as XPS (extruded rigid polystyrene foam), e.g. Styrodur® (BASF). Preference is given to polystyrene foams, for example Austrotherm® XPS, Styrofoam® (Dow Chemical) and others.

Preferably, the polymers are halogenated polymers, for example polychloroprene, chloro rubber, chlorinated and brominated copolymer of isobutylene-isoprene (halobutyl rubber), chlorinated or chlorosulfonated polyethylene, copolymers of ethylene and chlorinated ethylene, epichlorohydrin homo- and copolymers, especially polymers of halogenated vinyl compounds, for example polyvinyl chloride, polyvinylidene chloride, polyvinyl fluoride, polyvinylidene fluoride; and copolymers thereof, such as vinyl chloride-vinylidene chloride, vinyl chloride-vinyl acetate or vinylidene chloride-vinyl acetate.

Preferably, the polymers are polymers which derive from alpha,beta-unsaturated acids and derivatives thereof, such as polyacrylates and polymethacrylates, polymethylmethacrylates that have been impact-modified with butyl acrylate, polyacrylamides and polyacrylonitriles and copolymers of the monomers mentioned with one another or with other unsaturated monomers, for example acrylonitrile-butadiene copolymers, acrylonitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.

Preferably, the polymers are polymers that derive from unsaturated alcohols and amines or the acyl derivatives or acetals thereof, such as polyvinyl alcohol, polyvinyl acetate, stearate, benzoate or maleate, polyvinyl butyral, polyallyl phthalate, polyallylmelamine; and copolymers thereof with olefins.

Preferably, the polymers are homo- and copolymers of cyclic ethers, such as polyalkylene glycols, polyethylene oxide, polypropylene oxide or copolymers thereof with bisglycidyl ethers.

Preferably, the polymers are polyacetals, such as polyoxymethylene, and those polyoxymethylenes that contain comonomers, for example ethylene oxide; polyacetals modified with thermoplastic polyurethanes, acrylates or MBS.

Preferably, the polymers are polyphenylene oxides and sulfides and mixtures thereof with styrene polymers or polyamides.

Preferably, the polymers are polyurethanes that derive from polyethers, polyesters and polybutadienes having terminal hydroxyl groups on the one hand, and aliphatic or aromatic polyisocyanates on the other hand, and precursors thereof.

Preferably, the polymers are polyamides and copolyamides that derive from diamines and dicarboxylic acids and/or from aminocarboxylic acids or the corresponding lactams, such as nylon-2/12, nylon-4, nylon-4/6, nylon-6, nylon-6/6, nylon-6/9, nylon-6/10, nylon-6/12, nylon-6/6,6, nylon-7, nylon-7,7, nylon-8, nylon-8,8, nylon-9, nylon-9,9, nylon-10, nylon-10,9, nylon-10,10, nylon-11, nylon-12, aromatic polyamides based on m-xylene, diamine and adipic acid; polyamides prepared from hexamethylenediamine and iso- and/or terephthalic acid (polyhexamethyleneisophthalamide polyhexamethyleneterephthalamide) and optionally an elastomer as modifier, e.g. poly-2,4,4-trimethylhexamethyleneterephthalamide or poly-m-phenyleneisophthalamide, block copolymers of the aforementioned polyimides with polyolefins, olefin copolymers, ionomers or chemically bonded or grafted elastomers; or with polyethers, for example with polyethylene glycol, polypropylene glycol or polytetramethylene glycol, and also EPDM- or ABS-modified polyamides or copolyamides; and also polyamides condensed during the processing ("RIM polyamide systems").

Preferably, the polymers are polyureas, polyimides, polyamide imides, polyether imides, polyester imides, polyhydantoins and polybenzimidazoles.

Preferably, the polymers are polyesters which derive from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, polyhydroxybenzoates, and block polyetheresters which derive from polyethers having hydroxyl end groups; and also polyesters modified with polycarbonates or MBS.

The polymers are preferably polycarbonates and polyester carbonates.

The polymers are preferably polysulfones, polyether sulfones and polyether ketones.

Preferably, the polymers are crosslinked polymers which derive from aldehydes on the one hand and phenols, urea or melamine on the other hand, such as phenol-formaldehyde, urea-formaldehyde and melamine-formaldehyde resins.

Preferably, the polymers are drying and non-drying alkyd resins.

Preferably, the polymers are unsaturated polyester resins that derive from copolyesters of saturated and unsaturated dicarboxylic acids with polyhydric alcohols, and also vinyl compounds as crosslinking agents, and also the halogenated modifications thereof that are of low flammability.

Preferably, the polymers are crosslinkable acrylic resins that derive from substituted acrylic esters, for example from epoxy acrylates, urethane acrylates or polyester acrylates.

Preferably, the polymers are alkyd resins, polyester resins and acrylate resins, crosslinked with melamine resins, urea resins, isocyanates, isocyanurates, polyisocyanates or epoxy resins.

Preferably, the polymers are crosslinked epoxy resins that derive from aliphatic, cycloaliphatic, heterocyclic or aromatic glycidyl compounds, for example products of bisphenol A diglycidyl ethers, bisphenol F diglycidyl ethers, which are crosslinked by means of customary hardeners, for example anhydrides or amines, with or without accelerators.

Preferably, the polymers are mixtures (polyblends) of the aforementioned polymers, for example PP/EPDM (polypropylene/ethylene-propylene-diene rubber), polyamide/EPDM or ABS (polyamide/ethylene-propylene-diene rubber or acrylonitrile-butadiene-styrene), PVC/EVA (polyvinyl chloride/ethylene-vinyl acetate), PVC/ABS (polyvinyl chloride/acrylonitrile-butadiene-styrene), PVC/MBS (polyvinyl chloride/methacrylate-butadiene-styrene), PC/ABS (polycarbonate/acrylonitrile-butadiene-styrene), PBTP/ABS (polybutylene terephthalate/acrylonitrile-butadiene-styrene), PC/ASA (polycarbonate/acrylic ester-styrene-acrylonitrile), PC/PBT (polycarbonate/polybutylene terephthalate), PVC/CPE (polyvinyl chloride/chlorinated polyethylene), PVC/acrylates (polyvinyl chloride/acrylates), POM/thermoplastic PUR (polyoxymethylene/thermo-plastic polyurethane), PC/thermoplastic PUR (polycarbonate/thermoplastic polyurethane), POM/acrylate (polyoxymethylene/acrylate), POM/MBS (polyoxymethylene/methacrylate-butadiene-styrene), PPO/HIPS (polyphenylene oxide/high-impact polystyrene), PPO/PA 6,6 (polyphenylene oxide/nylon-6,6) and copolymers, PA/HDPE (polyamide/high-density polyethylene), PA/PP (polyamide/polyethylene), PA/PPO (polyamide/polyphenylene oxide), PBT/PC/ABS (polybutylene terephthalate/polycarbonate/acrylonitrile-butadiene-styrene) and/or PBT/PET/PC (polybutylene terephthalate/polyethylene terephthalate/polycarbonate).

The mixtures of the invention may also be used correspondingly in or on textiles without impairing the properties thereof.

The mixtures of the invention may be applied to flexible, especially textile, materials in random distribution or any particular pattern, for example in dotted form. Textiles of this kind are used, for instance, in the interior fitout of hotels, theaters and congress centers, and in modes of transport (bus, train, car, aircraft etc.).

The mixtures of the invention can be used together with other flame retardants as described, for instance, in Römpps Chemie-Lexikon [Römpp's Chemical Dictionary], 10th edition (1996), under "Flammschutzmittel" [Flame retardants].

Overall, the mixtures of the invention, alone or acting with other substances, can have carbonization-promoting, fire-quenching, barrier layer-forming, insulation layer-forming and other effects.

For all the aforementioned applications in polymers, especially olefins and in or for insulation layer-forming intumescent coatings and textiles, further additives can be added to the flame retardant systems or materials, especially antioxidants, antistats, blowing agents, further flame retardants, heat stabilizers, impact modifiers, processing aids, lubricants, light stabilizers, antidripping agents, compatibilizers, reinforcing agents, fillers, nucleating agents, laser marking additives, hydrolysis stabilizers, chain extenders, color pigments and/or plasticizers.

The invention is elucidated in a nonlimiting manner by the examples which follow.

To determine water solubility, a 10% by weight suspension of the mixture of the invention in water at 25° C. was prepared, stirred and filtered. The dry residue of the filtrate, relative to the starting amount, corresponds to the water solubility of this flame retardant.

To determine viscosity, a 10% by weight suspension of mixture of the invention in water at 25° C. was prepared and stirred. Viscosity was determined by means of a Brookfield viscometer according to DIN ISO 2555.

EXAMPLE 1

To 2997 g of Exolit® AP 422 in a tumbling mixer (from Heidolph) were added 3 g of ammonium sulfate, and the mixture was mixed at 320 revolutions per minute (rpm) for 5 h.

EXAMPLE 2

To 2994 g of Exolit® AP 422 in a tumbling mixer (from Heidolph) were added 6 g of ammonium sulfate (98%), and the mixture was mixed at 300 rpm for 5 h.

EXAMPLE 3

To 2991 g of Exolit® AP 422 in a tumbling mixer (from Heidolph) were added 9 g of ammonium sulfate, and the mixture was mixed at 290 rpm for 5 h.

EXAMPLE 4

To 2988 g of Exolit® AP 422 in a tumbling mixer (from Heidolph) were added 12 g of ammonium sulfate, and the mixture was mixed at 300 rpm for 5 h.

EXAMPLE 5 (COMPARATIVE)

To 2985 g of Exolit® AP 422 in a tumbling mixer (from Heidolph) were added 15 g of ammonium sulfate, and the mixture was mixed at 300 rpm for 5 h.

EXAMPLE 6 (COMPARATIVE)

To 2964 g of Exolit® AP 422 in a tumbling mixer (from Heidolph) were added 36 g of ammonium sulfate, and the mixture was mixed at 300 rpm for 5 h.

EXAMPLE 7

To 2997 g of Exolit® AP 422 in a tumbling mixer (from Heidolph) were added 3 g of sulfuric acid (98%), and the mixture was mixed at 330 rpm for 6 h.

EXAMPLE 8

To 2994 g of Exolit® AP 422 in a tumbling mixer (from Heidolph) were added 6 g of sulfuric acid (98%), and the mixture was mixed at 300 rpm for 5.5 h.

EXAMPLE 9

To 2991 g of Exolit® AP 422 in a tumbling mixer (from Heidolph) were added 9 g of sulfuric acid (98%), and the mixture was mixed at 300 rpm for 6 h.

EXAMPLE 10 (COMPARATIVE)

To 2988 g of Exolit® AP 422 in a tumbling mixer (from Heidolph) were added 12 g of sulfuric acid (98%), and the mixture was mixed at 300 rpm for 5 h.

EXAMPLE 11 (COMPARATIVE)

To 2985 g of Exolit® AP 422 in a tumbling mixer (from Heidolph) were added 15 g of sulfuric acid (98%), and the mixture was mixed at 300 rpm for 6 h.

EXAMPLE 12

To 2964 g of Exolit® AP 422 in a tumbling mixer (from Heidolph) were added 36 g of sulfuric acid (98%), and the mixture was mixed at 300 rpm for 5 h.

The mixtures obtained from examples 1 to 12 were each used to produce an intumescent formulation of the following composition:

27 parts by weight of the mixtures from examples 1 to 12
10 parts by weight of Pliolite® AC 80
8 parts by weight of melamine
8 parts by weight of pentaerythritol
8 parts by weight of titanium dioxide
6 parts by weight of chloroparaffin
ad 100 parts by weight thickener (Plioway® EC-T), auxiliaries and additives (butyldiglycol acetate (BDGA), Texano®), dispersing additives, solvents (Shellsol® 100/140, xylene, methyl ethyl ketone (MEK)).

The respective intumescent formulation was produced as described below:

a) the solvent is initially charged at room temperature and paint additives (Disperbyk®-2163 from BYK), dispersing aids and optionally defoamer are added while stirring,
b) the respective mixture from examples 1 to 12, blowing agent and carbon source, and also titanium dioxide and fillers, are scattered in while stirring at low speed,
c) the thixotropic agent (Luvotic® PA20XA from Lehmann & Voss & Co.) is scattered in while stirring,
d) dispersing is effected with high shear forces for at least 25 minutes while maintaining a temperature of 50° C., preferably of 55° C., for at least 10 minutes, preferably not exceeding a temperature of 60° C.,
e) homogeneous dispersion is effected for at least 5 minutes—peripheral speed of the dissolver disk 18-25 m/s—and the desired viscosity is established by adding solvents.

To test water stability, the fire protection coating thus obtained is applied to an aluminum sheet (70×150×0.8 mm) (the layer thickness prior to drying is 1 mm) and then dried at 26° C. for 24 h. Thereafter, half the sheet is immersed longitudinally into a water bath for a further 24 h, and then blister formation on the surface is visually assessed. The evaluation is effected by photography/with computer assistance.

Tables 1 and 2 indicate the proportion of the surface immersed into water that has been affected by blister formation in %. The greater the surface area affected, the lower the water stability. This is especially important for outdoor applications. If the coating is generally exposed to the moisture and weathering, good and lasting surface stability is of essential significance in order to assure smoothness of application and service life.

TABLE 1

| Entry | Exolit AP 422 (% by wt.) | Ammonium sulfate (% by wt.) | Surface area affected in % |
| --- | --- | --- | --- |
| Pure ammonium polyphosphate | 100 | 0 | 92 |
| Mixture from example 1 | 99.9 | 0.1 | 61 |
| Mixture from example 2 | 99.8 | 0.2 | 43 |
| Mixture from example 3 | 99.7 | 0.3 | 28 |
| Mixture from example 4 | 99.6 | 0.4 | 35 |
| Mixture from example 5 | 99.5 | 0.5 | 70 |
| Mixture from example 6 | 98.8 | 1.2 | 96 |

TABLE 2

| Entry | Exolit AP 422 (% by wt.) | Ammonium sulfate (% by wt.) | Surface area affected in % |
|---|---|---|---|
| Mixture from example 7 | 99.9 | 0.1 | 60 |
| Mixture from example 8 | 99.8 | 0.2 | 43 |
| Mixture from example 9 | 99.7 | 0.3 | 30 |
| Mixture from example 10 | 99.6 | 0.4 | 36 |
| Mixture from example 11 | 99.5 | 0.5 | 71 |
| Mixture from example 12 | 98.8 | 1.2 | 92 |

A series of experiments with mixtures of ammonium polyphosphate of the I form and ammonium sulfate gave analogous results in the test for water stability to table 1 and table 2.

To test storage stability, an intumescent formulation produced solely with ammonium polyphosphate (Exolit® AP 422) as prepared above was compared with one that contained a mixture of 99.7% by weight of Exolit® AP 422 and 0.3% by weight of ammonium sulfate according to example 3.

For the storage test, both intumescent formulations were stored under airtight conditions at 4° C. and the viscosity was monitored and measured over a period of 365 days.

| Day | Intumescent formulation comprising ammonium polyphosphate (Exolit ® AP 422) only | Intumescent formulation comprising mixture of 99.7% by wt. of Exolit ® AP 422 and 0.3% by wt. of ammonium sulfate according to example 3 |
|---|---|---|
| 1 | 25100 mPas | 23400 mPas |
| 20 | 25700 mPas | 22100 mPas |
| 60 | 26300 mPas | 22300 mPas |
| 120 | 28200 mPas | 23100 mPas |
| 365 | 29700 mPas | 24800 mPas |

It has been found that, surprisingly, the viscosity of an intumescent formulation of the invention comprising a mixture of 99.7% by weight of Exolit® AP 422 and 0.3% by weight of ammonium sulfate according to example 3, compared to an analogous mixture comprising pure ammonium polyphosphate, exhibits a significantly smaller rise in viscosity. A reduced viscosity facilitates the production procedure for the intumescent formulation; in addition, storage stability is increased. A lower viscosity additionally facilitates use in spraying systems.

EXAMPLE 13

The mixtures from example 2 and example 3 were each used to produce an intumescent formulation according to example 2 of EP-A-1400573, except that the Exolit® APP 462 mentioned therein was replaced by equal amounts of mixture of the invention.

The intumescent formulation thus produced was applied as an intumescent coating to a coated steel sheet (280×280×5 mm) and a fire test was conducted analogously to DIN 4102 Part 8, fire curve ISO 834, with a dry film thickness of 1000 μm. The result was a fire resistance time of 60 minutes with the mixture according to example 2, and of 62 minutes with the mixture according to example 3 ($T_{critical}$=500° C.).

The claimed mixtures of ammonium polyphosphate and a soluble inorganic compound are therefore of excellent suitability for production of effective intumescent coatings.

EXAMPLE 14

To 2990 g of Exolit® AP 422 in a tumbling mixer (from Heidolph) were added 10 g of sodium sulfate, and the mixture was mixed at 330 rpm for 6 h.

EXAMPLE 15

To 2986 g of Exolit® AP 422 in a tumbling mixer (from Heidolph) were added 14 g of iron (II) sulfate, and the mixture was mixed at 330 rpm for 6 h.

EXAMPLE 16

To 2989 g of Exolit® AP 422 in a tumbling mixer (from Heidolph) were added 11 g of titanium oxysulfate, and the mixture was mixed at 330 rpm for 6 h.

EXAMPLE 17

To 2989 g of Exolit® AP 422 in a tumbling mixer (from Heidolph) were added 11 g of zinc (II) sulfate, and the mixture was mixed at 330 rpm for 6 h.

EXAMPLE 18

To 2987 g of Exolit® AP 422 in a tumbling mixer (from Heidolph) were added 13 g of cerium (III) sulfate, and the mixture was mixed at 330 rpm for 6 h.

EXAMPLE 19

To 2993 g of Exolit® AP 422 in a tumbling mixer (from Heidolph) were added 7 g of lithium sulfate, and the mixture was mixed at 330 rpm for 6 h.

EXAMPLE 20

To 2991 g of Exolit® AP 422 in a tumbling mixer (from Heidolph) were added 9 g of calcium sulfate, and the mixture was mixed at 330 rpm for 6 h.

EXAMPLE 21

To 2992 g of Exolit® AP 422 in a tumbling mixer (from Heidolph) were added 8 g of aluminum sulfate, and the mixture was mixed at 330 rpm for 6 h.

EXAMPLE 22

To 2989 g of Exolit® AP 422 in a tumbling mixer (from Heidolph) were added 11 g of urea sulfate, and the mixture was mixed at 330 rpm for 6 h.

EXAMPLE 23

To 2985 g of Exolit® AP 422 in a tumbling mixer (from Heidolph) were added 15 g of melamine sulfate, and the mixture was mixed at 330 rpm for 6 h.

EXAMPLE 24

To 2984 g of Exolit® AP 422 in a tumbling mixer (from Heidolph) were added 16 g of barium sulfate, and the mixture was mixed at 330 rpm for 6 h.

EXAMPLE 25

To 2988 g of Exolit® AP 422 in a tumbling mixer (from Heidolph) were added 12 g of ammonium sulfate, and the mixture was mixed at 330 rpm for 6 h.

EXAMPLE 26

To 2989 g of Exolit® AP 422 in a tumbling mixer (from Heidolph) were added 11 g of magnesium sulfate, and the mixture was mixed at 330 rpm for 6 h.

EXAMPLE 27

To 2987 g of Exolit® AP 422 in a tumbling mixer (from Heidolph) were added 13 g of sodium sulfate, and the mixture was mixed at 330 rpm for 6 h.

EXAMPLE 28

To 2981 g of Exolit® AP 422 in a tumbling mixer (from Heidolph) were added 19 g of iron (II) sulfate, and the mixture was mixed at 330 rpm for 6 h.

EXAMPLE 29

To 2986 g of Exolit® AP 422 in a tumbling mixer (from Heidolph) were added 14 g of titanium oxysulfate, and the mixture was mixed at 330 rpm for 6 h.

EXAMPLE 30

To 2985 g of Exolit® AP 422 in a tumbling mixer (from Heidolph) were added 15 g of zinc (II) sulfate, and the mixture was mixed at 330 rpm for 6 h.

EXAMPLE 31

To 2983 g of Exolit® AP 422 in a tumbling mixer (from Heidolph) were added 17 g of cerium (III) sulfate, and the mixture was mixed at 330 rpm for 6 h.

EXAMPLE 32

To 2990 g of Exolit® AP 422 in a tumbling mixer (from Heidolph) were added 10 g of lithium sulfate, and the mixture was mixed at 330 rpm for 6 h.

EXAMPLE 33

To 2988 g of Exolit® AP 422 in a tumbling mixer (from Heidolph) were added 12 g of calcium sulfate, and the mixture was mixed at 330 rpm for 6 h.

EXAMPLE 34

To 2990 g of Exolit® AP 422 in a tumbling mixer (from Heidolph) were added 10 g of aluminum sulfate, and the mixture was mixed at 330 rpm for 6 h.

EXAMPLE 35

To 2986 g of Exolit® AP 422 in a tumbling mixer (from Heidolph) were added 14 g of urea sulfate, and the mixture was mixed at 330 rpm for 6 h.

EXAMPLE 36

To 2980 g of Exolit® AP 422 in a tumbling mixer (from Heidolph) were added 20 g of melamine sulfate, and the mixture was mixed at 330 rpm for 6 h.

EXAMPLE 37

To 2979 g of Exolit® AP 422 in a tumbling mixer (from Heidolph) were added 21 g of barium sulfate, and the mixture was mixed at 330 rpm for 6 h.

EXAMPLE 38

To 2992 g of Exolit® AP 422 in a tumbling mixer (from Heidolph) were added 8 g of magnesium sulfate, and the mixture was mixed at 330 rpm for 6 h.

The mixtures obtained from examples 14 to 38 were incorporated into intumescent formulations in the same way as the mixtures of examples 1 to 12. These likewise exhibit reduced viscosity and elevated storage stability.

The invention claimed is:

1. An intumescent formulation for a fire protection coating, comprising a mixture of:
   as component (A) ammonium polyphosphate; and
   as component (B) lithium sulfate, magnesium sulfate, calcium sulfate, barium sulfate, iron (III) sulfate, iron (II) sulfate, titanium sulfate, cerium sulfate, melamine sulfate, urea sulfate, ammonium sulfate or a mixture thereof,
   wherein the mixture has a water solubility of less than 0.5 (10% suspension in water at 25° C.),
   wherein the mixture comprises 99.55 to 99.99% by weight of component (A); and 0.01% to 0.45% by weight of component (B), and
   wherein the sum total of the components is 100% by weight.

2. The intumescent formulation as claimed in claim 1, wherein the ammonium polyphosphate is of the crystal form I, II, III, IV, V, VI, a branched ammonium polyphosphate or a mixture thereof.

3. The intumescent formulation as claimed in claim 1, wherein the ammonium polyphosphate is one of the crystal form I, II, V or a mixture thereof.

4. The intumescent formulation as claimed in claim 1, wherein the ammonium polyphosphate is of the formula $(NH_4)_{n+2}P_nO_{3n+1}$ with $n \geq 2$.

5. The intumescent formulation as claimed in claim 1, wherein the ammonium polyphosphate is of the formula $(NH_4)_{n+2}P_nO_{3n+1}$ with n from 10 to 10 000.

6. The intumescent formulation as claimed in claim 1, wherein component (B) is ammonium sulfate.

7. The intumescent formulation as claimed in claim 1, comprising:
   99.60% to 99.80% by weight of component (A); and
   0.20% to 0.40% by weight of component (B),
   wherein the sum total of the components is 100% by weight.

8. The intumescent formulation as claimed in claim 1, comprising:
   99.60% to 99.80% by weight of component (A); and
   0.20% to 0.40% by weight of component (B),
   wherein component (B) is ammonium sulfate, and
   wherein the sum total of the components is 100% by weight.

9. The intumescent formulation as claimed in claim 1, wherein the mixture has:
   a residual moisture content of less than 0.5%,
   a bulk density of 0.3 to 0.9 g/cm$^3$, a viscosity of less than 40 mPas (Brookfield DV3T, spindle 1) (10% suspension in water at 25° C.), a particle size $d_{50}$ of 5 to 35 μm, a chain length of n greater than 1000 for the ammonium polyphosphate; and a pH of 4 to 8.

10. A process for producing a mixture as claimed in claim 1, comprising mixing component (A) and component (B) together, each in pulverulent or granular form, or introducing component (B) in dissolved form into component (A).

11. The process as claimed in claim 10, wherein 99.55% to 99.99% by weight of component (A) and 0.01% to 0.45% by weight of component (B) are mixed with one another, wherein component (B) is ammonium sulfate, and wherein the sum total of the components is 100% by weight.

12. A process for producing a mixture as claimed in claim 1, comprising heating equimolar amounts of ammonium dihydrogen orthophosphate and urea to a temperature of 250 to 300° C. for a period of 0.5 to 4 hours with simultaneous addition of component (B).

13. A process for producing a mixture as claimed in claim 1, comprising heating equimolar amounts of ammonium orthophosphate and urea to a temperature of 250 to 305° C. for a period of 0.1 to 4 hours under a moist ammonia atmosphere with simultaneous addition of component (B).

14. A process for producing a mixture as claimed in claim 1, comprising heating equimolar amounts of ammonium orthophosphate and urea to a temperature of 320 to 350° C. for a period of 0.1 to 4 hours under a moist ammonia atmosphere with simultaneous addition of component (B).

15. A process for producing a mixture as claimed in claim 1, comprising mixing and reacting phosphorus pentoxide, diammonium orthophosphate and component (B) together in molarity ratios of 1:1:0.01 to 0.08 in ammonia gas atmosphere over a period of 5 to 10 minutes and then successively a) conducting a polymerization reaction over a period of 15 to 45 minutes with supply of ammonia gas at a maximum reactor pressure of 490 to 980 Pa and at a minimum temperature of 180 to 200° C., b) feeding in ammonia gas at a temperature in the range from 200 to 220° C. and a minimum reactor pressure between 0 and 980 Pa for a period of 2 to 4 hours, c) separating off and working up the products obtained, wherein component (B) is ammonium sulfate.

* * * * *